United States Patent Office 3,135,746
Patented June 2, 1964

3,135,746
NEW 1-OXO-2:3-DIAZA-PHENTHIAZINES
Jean Druey and Konrad Meier, both of Riehen, and Alexander Staehelin, Basel, Switzerland, assignors to Ciba Corporation, a corporation of Delaware
No Drawing. Filed July 20, 1960, Ser. No. 43,996
Claims priority, application Switzerland Aug. 5, 1959
12 Claims. (Cl. 260—243)

The present invention relates to 2-Z-10-R-X-1-oxo-1:2-dihydro - 2:3 - diaza-phenthiazines, their quaternary ammonium compounds, oxides and salts thereof, in which Z represents a lower hydrocarbon radical which may be substituted, R stands for an amino group and X for a lower aliphatic, alicyclic or alicyclic-aliphatic hydrocarbon radical.

These compounds are derivatives of a new heterocyclic basic substance, viz. 2:3-diazaphenthiazine of the formula

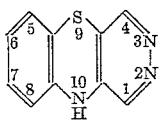

The amino group R may be unsubstituted. Preferably it is mono- or especially di-substituted. As substituents especially lower hydrocarbon radicals come into consideration which may also be interrupted by hetero atoms, such as oxygen, sulfur or nitrogen and/or substituted by free hydroxyl, amino or mercapto groups or halogen atoms, such as fluorine, chlorine, bromine or iodine. As lower hydrocarbon radicals there may be mentioned especially: lower alkyl or alkenyl radicals, such as methyl, ethyl, propyl, isopropyl, branched or unbranched butyl, pentyl, hexyl or heptyl radicals which may be bound in any position, allyl or methallyl radicals, unsubstituted or alkyl-substituted cycloalkyl or cycloalkenyl radicals, such as cyclopentyl, cyclohexyl, cycloheptyl, cyclopentenyl, cyclohexenyl radicals, unsubstituted or alkyl-substituted cycloalkyl-alkyl or cycloalkenyl-alkyl radicals, such as cyclopentyl- or cyclohexenyl-methyl, -ethyl or -propyl radicals, aralkyl or aralkenyl groups, such as phenylmethyl, phenylethyl, phenylvinyl or phenylpropyl radicals, or aryl groups, especially phenyl radicals, or alkylene radicals, such as for example butylene-(1:4), pentylene-(1:5), 1:5-dimethylpentylene(1:5), hexylene(1:6), hexylene(1:5). Radicals of this type interrupted by hetero atoms are, for example, alkoxy-alkyl or oxa-cycloalkyl-alkyl radicals, such as methoxyethyl, ethoxyethyl, propoxyethyl, butoxyethyl, methoxypropyl, methoxyethoxyethyl, tetrahydrofurylmethyl, methylmercaptoethyl, oxa-alkylene, aza-alkylene or thia-alkylene or oxa-alkenylene, aza-alkenylene or thia-alkenylene radicals, such as 2-aza, oxa- or thia-butene-(3:4)-ylene-(1:4), 2-aza-but-diene-(1:2;3:4)-ylene-(1:4), 2-aza, oxa- or thia-butylene-(1:4) radicals, 2-aza-, oxa- or thiapentene-(3:4)-ylene-(1:5), 2-aza-pent-diene-(2:3;4:5)-ylene-(1:5), 3-aza-, oxa- or thia-pentylene-(1:5), 3-aza-hexylene-(1:6), 1:5-dimethyl-3-aza-pentylene-(1:5), 3-methyl-3-aza-pentylene-(1:5) or 3-hydroxyethyl-3-aza-pentylene-(1:5) radicals. The amino group is more especially a di-lower alkylamino group such as the dimethylamino, diethylamino, dipropylamino, N-methyl-N-ethylamino group, an N-lower alkyl-N-cycloalkylamino group, such as the N-methyl-N-cyclopentyl or N-methyl-N-cyclohexyl group, a pyrrolidino, piperidino, morpholino or thia-morpholino group, such as the pyrrolidino, piperidino, morpholino, piperazino or N-methylpiperazino group.

A fourth substituent on a quaternary ammonium group R is especially a lower alkyl radical, such as a methyl, ethyl, propyl, benzyl or phenoxy-lower alkyl radicals, such as the phenoxyethyl group.

The radical X is more especially a lower alkylene or alkenylene radical, for example methylene, ethylene-(1:2), ethylene-(1:1), propylene-(1:1), propylene-(1:2), propylene-(1:3,) butylene-(1:1), butylene-(1:2), butylene-(1:3), butylene-(2:3), butene-2:3-ylene-1:4- or butylene-(1:4). A carbon atom of the radical X may also be bound with a nitrogen, oxygen, sulfur or carbon atom of the amino group R to a 5 to 8-membered non-aromatic ring, so that the group R—X may be, for example, a di- or tetra-hydropyrimidyl, oxazyl, thiazyl, imidazolyl, imidazolidyl or pyrrolidine-3-yl group or a lower alkyl radical bearing such a group, such as a methyl or ethyl radical. It may also be interrupted in the carbon chain by oxygen or sulfur, for example a 3-oxa- or 3-azapentylene-(1:5) radical.

The hydrocarbon radical Z is advantageously a lower aliphatic, alicyclic or alicyclic-aliphatic hydrocarbon radical which may be substituted, such as an alkyl, alkenyl, cycloalkyl, cycloalkenyl, cycloalkyl-alkyl or cycloalkenyl-alkyl radical, such as are, for example, described as substituents of R above, or an aryl, aralkyl or heterocyclic radical which may be substituted, such as phenyl, benzyl, phenethyl, pyridyl, thenyl or thienyl radical.

Substituents for the aliphatic hydrocarbon radicals are more especially free or substituted hydroxyl or mercapto groups, for example lower alkoxy or alkyl-mercapto groups, such as methoxy, ethoxy, propoxy, butoxy, methylmercapto, halogen atoms, such as chlorine or bromine, free or functionally converted carboxyl groups, for example nitrile, carbamyl or carbalkoxy groups. Substituents of the alicyclic radicals are particularly lower alkyl radicals and substituents of the heterocyclic radicals are, for example, also alkyl radicals, halogen atoms or nitro groups, and substituents of the phenyl radicals are especially lower alkyl, alkylmercapto or alkoxy groups, such as, for example those previously shown, halogen atoms, trifluoromethyl groups, nitro, nitrile, amino or alkanoyl, for example acetyl groups.

The radical Z is more especially a lower alkyl radical, for example methyl, ethyl or propyl or a phenyl, alkylphenyl, halogenphenyl or alkoxyphenyl radical.

The new compounds may be substituted at the ring carbon atoms of the diaza-phenthiazine ring, for example by the substituents given above for the phenyl radicals.

Oxides of the new compounds are N- or S-oxides.

The new aza-phenthiazines have valuable pharmacological properties. They inhibit the transmission of stimuli in the central nervous system. Consequently, they may be used as spinal blockers in nervous diseases, particularly those involving increased spasticity. They have also a histaminolytic and antiparasitic effect and can be used accordingly. Finally, they may serve as intermediate products, for example for the preparation of medicaments.

Especially valuable as regards the inhibitory effect on transmission of stimuli in the central nervous system are compounds of the formula

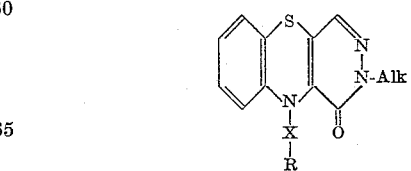

and their salts, in which formula Alk represents a lower alkyl radical, especially methyl, and R—X has the meaning given above, especially a di-lower alkylaminoethyl, pyrrolidinoethyl, piperidinoethyl or morpholinoethyl or di-lower alkylaminopropyl, pyrrolidinopropyl, piperidino-propyl or morpholinopropyl radical, particularly 2-methyl - 10 - (γ-dimethylamino-propyl) - 1 - oxo-1:2-dihydro-2:3-diaza-phenthiazine and its salts.

The preceding new compounds are obtained when the radical R—X is introduced in the 10-position of the 2-Z-10-H-1-oxo - 1:2 - dihydro - 2:2 - diazaphenothiazines wherein Z has the meaning above given.

For the introduction of the radical R—X a method known per se is used. It is of advantage to perform the reaction with a reactive derivative of an alcohol of the formula R—X—OH, for example a reactive ester. This reaction is preferably carried out in the presence of a basic condensing agent, such as an alcoholate, amide or hydride of an alkali metal or using a metal salt of a 10-H-diazaphenthiazine.

The above reactions are carried out in the customary manner or in an equivalent way. Reactive esters of hydroxyl compounds are especially those with strong inorganic acids, such as mineral acids, for example hydrochloric or sulphuric acids, or organic sulfonic acids, such as aryl sulfonic acids, for example toluene- or benzenesulfonic acid.

A resulting compound containing an amino group capable of quaternization may be quaternated in the conventional manner, for example by treatment with a reactive ester of a lower alkanol or benzyl alcohol. Tertiary amines may the N-oxidized in the usual manner, for example with a per-acid, such as per-benzoic acid or perphthalic acid. S-oxides may also be prepared in the usual manner.

Depending on the procedure employed the new compounds are obtained in the form of the free bases or their salts which can be converted one into the other in the usual manner. Salts of the new compounds are primarily those with therapeutically useful acids, for example inorganic acids, for example hydrohalic acids, such as hydrochloric acid or hydrobromic acid, perchloric acid, nitric acid or thiocyanic acid, sulfuric or phosphoric acids, or with organic acids such as formic acid, acetic acid, propionic acid, glycollic acid, lactic acid, pyruvic acid, oxalic acid, malonic acid, succinic acid, maleic acid, fumaric acid, malic acid, tartaric acid, citric acid, ascorbic acid, hydroxymaleic acid, dihydroxymaleic acid, benzoic acid, phenylacetic acid, 4-amino-benzoic acid, 4-hydroxybenzoic acid, anthranilic acid, cinnamic acid, mandelic acid, salicylic acid, 4-amino-salicylic acid, 2-phenoxybenzoic acid, 2-acetoxy-benzoic acid, methane-sulfonic acid, ethane-sulfonic acid, hydroxy-ethane-sulfonic acid, benzene-sulfonic acid, para-toluene-sulfonic acid, naphthalene-sulfonic acid or sulfamyl acids or methionine, tryptophane, lysine or arginine.

The 2-Z-10-H-1-oxo-1:2-dihydro - 2:3 - diaza - phenthiazines, used as starting materials are obtained when a 5-(o-amino-phenylmercapto)-4-halogeno-2-Z-3-oxo-2:3-dihydro-pyridazine in which Z has the meaning given above is condensed to form the diazaphenthiazine ring.

The condensation is carried out in a manner known per se, advantageously with a basic or acid condensing agent, such as hydrochloric acid or an alkali amide. When anhydrides of carboxylic acids, for example acetic anhydride, or other acylating agents are used as condensing agents, 10-acylated compounds are obtained which are hydrolyzed in the usual manner.

The other starting materials are known or may be prepared in a manner known per se. New products are, for example, the previously mentioned 5-(o-NH₂-phenylmercapto)-4-halogeno-2-Z-3-oxo - 2:3 - dihydro - pyridazines which are obtained by reacting the corresponding 4:5-dihalogen-2-Z-3-oxo - 2:3 - dihydropyridazines with o-NH₂-thiophenols, which is preferably carried out in the presence of a basic condensing agent, especially one which forms salts with the mercapto group, such as an alkali alcoholate. New are also the intermediate products 10-H-, or 10-acyl-2-Z-1-oxo-1:2-dihydro-2:3-diazaphenthiazines.

These new starting or intermediate products are also included within the scope of the present invention.

The new compounds may be used as medicaments, for human beings or animals, for example in the form of pharmaceutical preparations containing them or their salts in admixture with a solid or liquid pharmaceutical organic or inorganic excipient suitable for enteral, parenteral or topical administration. Suitable excipients are substances that do not react with the new compounds, such as water, gelatine, lactose, starches, magnesium stearate, talc, vegetable oils, benzyl alcohols, gums, polyalkylene glycols, white petroleum jelly, cholesterol or any other known medicinal excipient. The pharmaceutical preparations may be, for example tablets, dragees, salves or creams, or in liquid form as solutions, suspensions or emulsions. They may be sterilized and/or contain auxiliary substances, such as preserving agents, stabilizing, wetting or emulsifying agents, salts for varying the osmotic pressure or buffers. They may also contain other therapeutically useful substances. The preparations are obtained by the customary methods.

The following examples illustrate the invention:

*Example 1*

Sodamide is prepared in the usual manner by introducing 1.3 grams of bright sodium and a trace of ferric nitrate into 250 cc. of liquid ammonia. The whole is stirred for 2 hours and 11.5 grams of finely powdered 2-methyl-1-oxo-1:2-dihydro - 2:3 - diazaphenthiazine are added. After stirring for 4 hours the carbon dioxide/acetone bath is removed, and the ammonia is allowed to evaporate overnight by passing through a current of dry nitrogen with stirring. 200 cc. of absolute dioxane are then added, and the residual ammonia is expelled by heating for 2 hours at 80 to 90° C.

11 grams of β-diethylamino-ethyl chloride are then added dropwise within 1½ hours at 80 to 90° C.; the mixture is heated for a further 2½ hours at 80 to 90° C., a small amount of methanol is added (to destroy the excess sodamide), cooled, filtered through kieselguhr and evaporated under reduced pressure. The residue is heated with 100 cc. of N-hydrochloric acid on the water bath, while still hot, freed by suction-filtration from a small amount of insoluble starting material, to filtrate is alkalinized with concentrated ammonia, and the precipitated crystalline base is suctioned off and recrystallized from acetone+petroleum ether.

2-methyl-10-(β-diethylamino-ethyl)-1-oxo-1:2-dihydro-2:3-diazaphenthiazine of the formula

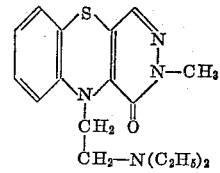

forms orange-yellow needles melting at 109.5 to 110° C. The hydrochloride, prepared in the usual manner, crystallizes from water in fine yellow needles melting at 229 to 230° C.

The starting material may be obtained as follows (a) 82.5 grams of 4:5 - dichloro - 3 - oxo - 2:3 - dihydropyridazine are dissolved with heating in 550 cc. of dioxane and at 40° C. treated with 500 cc. of N-sodium hydroxide solution. 50 cc. of dimethyl sulfate are then stirred in dropwise at 40° C. After stirring on for 30 minutes at 40 to 50° C. the solution is filtered with carbon, and the filtrate is evaporated under reduced pressure. The crystalline residue is stirred with a small amount of water, suctioned off and dried in vacuo at 50 to 60° C. The resulting 2-methyl-4:5-dichloro-3-oxo-2:3-dihydro-pyridazine is practically pure. It can be recrystallized from acetone+petroleum ether and forms colorless platelets melting at 89–90° C.

(b) 16.9 grams of chloromucic acid are dissolved with heating in 50 cc. of water, and this hot solution is mixed with a solution of 4.6 grams of methylhydrazine in 50 cc. of 2 N-hydrochloric acid. The mixture is heated for 2 hours on a water bath. After a few minutes an oil separates out which crystallizes on cooling. The reaction product is extracted with chloroform, and the chloroformic extract is dried over sodium sulfate and evaporated. The crystalline residue is recrystallized from ethyl acetate+petroleum ether; the resulting slightly yellowish platelets melt at 88–90° C. and show no melting point depression in the mixed melting point test with the product obtained as described under (*a*) above.

A solution of 1.15 grams of sodium in 30 cc. of absolute methanol is treated with 6.5 grams of ortho-aminothiophenol. Within 1 hour a solution of 9 grams of 2-methyl-4:5-dichloro-3-oxo-2:3-dihydro-pyridazine in 70 cc. of absolute methanol is then stirred in dropwise at 20–25° C. The whole is then completely evaporated to dryness in vacuo on a water bath at 40° C. and the residue is dissolved in methylene chloride and washed with water. The methylene chloride solution is dried over sodium sulfate and evaporated, and the crude 2-(2'-methyl - 4' - chloro - 3'-oxo-2':3'-dihydropyridazylthio)-aniline is heated with 25 cc. of acetanhydride for 1 hour on a water bath, then cooled, and the resulting crystalline 2-methyl-10-acetyl-1-oxo-1:2-dihydro-2:3-diazaphenthiazine of the formula

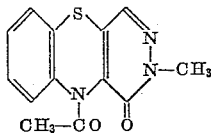

is suctioned off and washed with a small amount of methanol. The product forms colorless crystals melting at 198–199° C.

10 grams of the acetyl compound are mixed with a solution of 2.5 grams of potassium hydroxide, 3 cc. of water and 25 cc. of methanol and heated for 1 hour on a water bath. The colorless acetyl derivative passes into solution, the solution immediately turns yellowish red, and the hydrolysate begins to crystallize out. After cooling, it is suctioned off, washed with water and methanol, and dried in vacuo. 2-methyl-1-oxo-1:2-dihydro-2:3-diazaphenthiazine of the formula

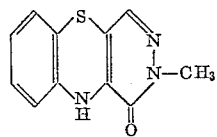

forms yellowish red needles melting at 329–330° C. with decomposition. In most organic solvents it is rather sparingly soluble, but can readily be recrystallized from dimethyl formamide.

*Example 2*

11.5 grams of 2-methyl-1-oxo-1:2-dihydro-2:3-diazaphenthiazine are converted into the sodium compound in liquid ammonia as described in Example 1. The ammonia is then removed in the manner described in Example 1, the residue is treated with dioxane and reacted at 80–90° C. with a solution of γ-dimethylamine-propyl chloride in toluene. This solution is prepared by dissolving 16 grams of γ-dimethylamino-propyl chloride hydrochloride in a small amount of water, treating with an excess of potassium carbonate, dissolving the precipitate chloro-base in toluene and drying over calcined potash. After stirring for 3 hours at 80 to 90° C. the reaction mixture is worked up as described in Example 1. The crude base can be distilled in a high vacuum (boiling point 220–225° C. under a pressure of 0.08 mm. Hg), and the distillate can be recrystallized from acetone+petroleum ether. The 2-methyl-10-(γ-dimethylaminopropyl)-1-oxo-1:2 - dihydro - 2:3-diazaphenthiazine of the formula

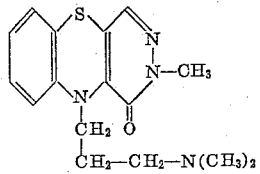

forms orange-yellow needles melting at 119–120° C.

The hydrochloride, prepared in the conventional manner, crystallizes in red needles when it is dissolved with heating in a little water and the solution is diluted with warm acetone. In an evacuated melting point tube it melts at 110 to 120° C. with liberation of water of crystallization.

*Example 3*

The sodium compound prepared as described in Example 1 from 11.5 grams of 2-methyl-2:3-diazaphenthiazine-(1) in dioxane is treated at 90 to 100° C. in the course of 4 hours with the toluenic solution of the free chloro-base prepared as described in Example 2 from 20 grams of β-dimethylamino-ethyl chloride hydrochloride, and the whole is refluxed for 3 hours. Working up as described in Example 1 is followed by recrystallization of the resulting crystalline base from acetone+cyclohexane; the product melts at 122–123° C. 2-methyl-10-(β-dimethylamino-ethyl)-1-oxo-1:2-dihydro-2:3-diaza-phenthiazine of the formula

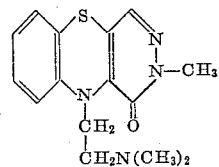

is converted in the usual manner into the hydrochloride which is obtained in crystals containing water of crystallization from aqueous acetone. When dried in a high vacuum at 100°, the product loses its water of crystallization, and the bright red needles turn orange yellow. Melting point: 246–248° C.

*Example 4*

The sodium compound of 2-methyl-1-oxo-1:2-dihydro-2:3-diazaphenthiazine prepared as described in Example 1 is reacted in dioxane at 90–100° C. with the free base prepared from 13 grams of 1-chloro-2:2-dimethyl-3-diethyl-amino-propane hydrochloride as described in Example 2. The whole is refluxed for 4 hours and then worked up, to yield 2-methyl-10-(γ-diethylamino-β:β-dimethylpropyl)-1-oxo-1:2-dihydro-2:3-diazaphenthiazine of the formula

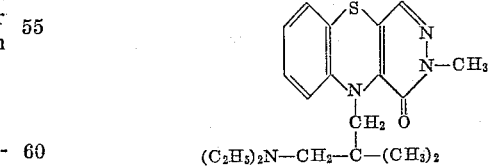

which is distilled in a high vacuum. Boiling point: 202–208° C. under a pressure of 0.07 mm. Hg. The base is dissolved in acetone, the solution is mixed with the calculated amount of N-hydrochloric acid, evaporated to dryness and the residue is recrystallized from a mixture of acetone and alcohol of 95% strength. Melting point of the hydrochloride: 237–239° C.

*Example 5*

The sodium compound prepared as described in Example 1 from 11.5 grams of 2-methyl-1-oxo-1:2-dihydro-2:3-diazaphenthiazine is reacted in dioxane with 9.7 grams of N-methyl-N'-γ-chloropropyl-piperazine. The whole is heated for 10 hours at 100° C. and then worked up as described in Example 1. To purify the crude base it is again dissolved in warm, dilute hydrochloric acid, the solution is filtered with carbon, and the base is precipitated by adding sodium hydroxide solution; it is isolated by dissolution in chloroform and then recrystallized from acetone. 2-methyl-10-[γ-(N-methylpiperazino) - propyl]-1-oxo-1:2-dihydro-2:3-diazaphenthiazine of the formula

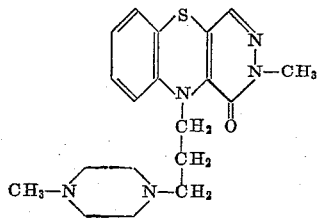

forms orange-yellow prisms melting at 140.5 to 141.5° C. The hydrochloride, prepared in a similar manner, is recrystallized from aqueous acetone, dried in a high vacuum at 100° C. and melts in this form at 268–270° C.

*Example 6*

2-methyl - 1 - oxo - 1:2 - dihydro-2:3-diazaphenthiazine is reacted with γ-morpholino-propyl chloride as described in Example 1. 2-methyl-10-(γ-morpholino-propyl)-1-oxo-1:2-dihydro-2:3-diazaphenthiazine of the formula

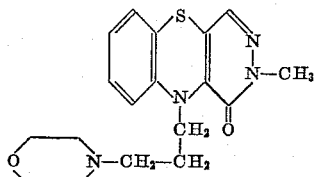

melts at 121–122° C. after recrystallization from acetone+petroleum ether. The hydrochloride recrystallized from aqueous acetone contains water or crystallization which is given off at about 150° C., with the substance melting partially and then spontaneously solidifying again; the anhydrous modification finally obtained melts at 230° C.

*Example 7*

2 - methyl - 1 - oxo - 1:2 - dihydro - 2:3 - diazaphenthiazine is reacted with β-morpholino-ethyl chloride as described in Examples 1 and 6. The resulting 2-methyl-10-(β - morpholino - ethyl) - 1 - oxo - 1:2 - dihydro - 2:3-diazaphenthiazine of the formula

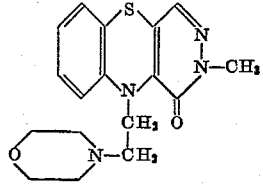

melts at 173–174° C. Its hydrochloride melts at 263–265° C.

*Example 8*

2 - methyl - 1 - oxo - 1:2 - dehydro - 2:3 - diaza - 10-(γ-diethylamino-propyl)-phenthiazine of the formula

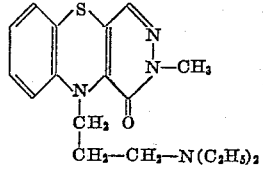

is prepared as described in Example 1 with the use of β-diethylamino-propyl chloride. The base melts at 132–132.5° C. The hydrochloride recrystallized from aqueous acetone contains water of crystallization and melts at about 110° C.

In an analogous manner starting from 2-phenyl-1-oxo-1:2 - dihydro - 2:3 - diaza - phenthiazine there is obtained 2 - phenyl - 1 - oxo - 1:2 - dehydro - 2:3 - diaza - 10-(γ-diethylamino-propyl)-phenthiazine. The starting material is obtained as follows:

10 grams of 2-phenyl-4:5-dichloro-3-oxo-2:3-dihydro-pyridazine in 200 cc. of methanol are heated to the boil and treated dropwise with a solution of 1.0 gram of sodium in 50 cc. of methanol and 5.2 grams of ortho-amino-thiophenol, and the mixture is then heated for 3 hours on a water bath. The methanol is distilled off, and the residue is treated with water, acidified, and agitated with chloroform. The chloroformic extract is dried, evaporated to dryness, and the crude 2-(2'-phenyl-4'-chloro-3'-oxo-2':3'-dihydro-pyridazyl-thio)-aniline is heated with 30 cc. of acetanhydride for 1 hour on a water bath. After cooling, the crystalline 2-(2'-phenyl-4'-chloro-3'-oxo-2':3'-dihydro-pyridazyl-thio)-acetanilide of the formula

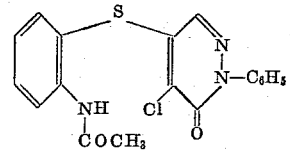

is suctioned off and washed with ether. From glacial acetic acid it gives colorless crystals melting at (205) 209–210° C.

4.5 grams of the above acetyl compound are heated with 45 cc. of 2 N-sodium hydroxide solution and 20 cc. of dioxane for 1 hour on an oil bath at 125° C. The solution froths, turns red, and the hydrolysate begins to crystallize out. After cooling it is suctioned off, washed with a large amount of water and thoroughly dried under reduced pressure. 2-phenyl-1-oxo-1:2-dihydro-2:3-diazaphenthiazine of the formula

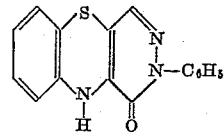

forms red crystals melting at (317) 325–328° C.

It is sparingly soluble in most organic solvents, but is easy to recrystallize from dimethyl formamide.

What is claimed is:

1. A member selected from the group consisting of a compound of the formula

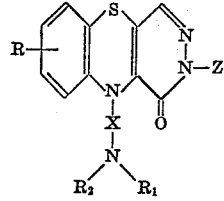

a therapeutically useful quaternary ammonium compound, oxide and acid addition salt of said compound, in which formula R stands for hydrogen, lower alkyl, lower alkoxy, halogen, and trifluoromethyl, and Z stands for a member selected from the group consisting of lower alkyl, cyclo-lower alkyl, phenyl, and benzyl, X stands for lower alkylene and $R_1$ and $R_2$ each stands for a member selected from the group consisting of hydrogen, lower alkyl, lower alkenyl, cyclo-lower alkyl, cyclo-lower alkyl-lower alkyl and cyclo-lower alkenyl-lower alkyl, and wherein $R_1$ and $R_2$, when taken together, stand for a member selected from the group consisting of lower alkylene, lower oxa-alkylene, lower aza-alkylene and lower thia-alkylene.

2. A compound of the formula:

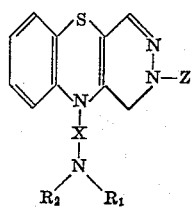

wherein Z stands for lower alkyl, X for lower alkylene and $R_1$ and $R_2$ each stands for lower alkyl.

3. A compound of the formula:

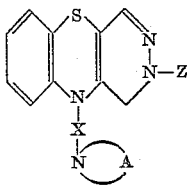

wherein Z stands for lower alkyl, X for lower alkylene and A stands for lower oxa-alkylene.

4. A compound of the formula:

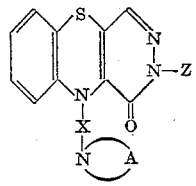

wherein Z stands for lower alkyl, X for lower alkylene and A stands for lower alkylene.

5. 2-methyl-10-(γ-dimethylamino-propyl)-1-oxo-1:2-dihydro-2:3-diaza-phenthiazine.

6. 2-methyl-10-(β-dimethylamino-ethyl)-1-oxo-1:2-dihydro-2:3-diaza-phenthiazine.

7. 2-methyl-10-(γ-diethylamino-β:β-dimethyl-propyl)-1-oxo-1:2-dihydro-2:3-diaza-phenthiazine.

8. 2-methyl-10-(γ-morpholino-propyl)-1-oxo-1:2-dihydro-2:3-diaza-phenthiazine.

9. 2-methyl-10-(β-morpholino-ethyl)-1-oxo-1:2-dihydro-2:3-diaza-phenthiazine.

10. A member selected from the group consisting of 5-(o-$NH_2$-phenylmercapto)-4-halogen-2-Z-3-oxo-2:3-dihydro-pyridazines and their salts, in which Z is a member selected from the group consisting of lower alkyl, cycloalkyl, phenyl and benzyl.

11. A member selected from the group consisting of 10-H- and 10-lower alkanoyl-2-Z-1-oxo-1:2-dihydro-2:3-diaza-phenthiazines and their salts, in which Z is a member selected from the group consisting of lower alkyl, cycloalkyl, phenyl and benzyl.

12. 2-methyl-10-(γ-diethylamino-propyl)-1-oxo-1:2-dihydro-2:3-diaza-phenthiazine.

References Cited in the file of this patent
FOREIGN PATENTS 1,110,651    Germany _____ July 13, 1961

OTHER REFERENCES

Druey: Angew. Chemie, vol. 70, pages 5 to 13 (1958).